(12) United States Patent
Ullom

(10) Patent No.: US 9,222,612 B2
(45) Date of Patent: Dec. 29, 2015

(54) ANTI-FOULING APPARATUS FOR CLEANING DEPOSITS IN PIPES AND PIPE JOINTS

(71) Applicant: Vadxx Energy LLC, Cleveland, OH (US)

(72) Inventor: William L. Ullom, North Canton, OH (US)

(73) Assignee: VADXX ENERGY LLC, Cleveland, OH (US)

( * ) Notice: Subject to any disclaimer, the term of this patent is extended or adjusted under 35 U.S.C. 154(b) by 124 days.

(21) Appl. No.: 13/735,677

(22) Filed: Jan. 7, 2013

(65) Prior Publication Data

US 2013/0174363 A1     Jul. 11, 2013

Related U.S. Application Data

(60) Provisional application No. 61/584,074, filed on Jan. 6, 2012.

(51) Int. Cl.
*F16L 55/28* (2006.01)
*B08B 9/055* (2006.01)
*B08B 9/043* (2006.01)

(52) U.S. Cl.
CPC ............. *F16L 55/28* (2013.01); *B08B 9/0436* (2013.01); *B08B 9/0553* (2013.01)

(58) Field of Classification Search
CPC ...... B08B 9/0436; B08B 9/0553; F16L 55/28
USPC ........... 15/104.05, 104.09, 104.061, 104.167; 137/15.07
See application file for complete search history.

(56) References Cited

U.S. PATENT DOCUMENTS 1,756,378 A * 4/1930 Oberhuber ............... 15/104.061
2,636,202 A * 4/1953 Hinzman ................. 15/104.061
(Continued)

FOREIGN PATENT DOCUMENTS

CN     102015969 A     4/2011
EP       1405895 A1    4/2004
(Continued)

OTHER PUBLICATIONS

International Search Report and Written Opinion from PCT/US2013/026412 dated Apr. 19, 2013.
(Continued)

*Primary Examiner* — Monica Carter
*Assistant Examiner* — Michael Jennings
(74) *Attorney, Agent, or Firm* — Calfee, Halter & Griswold LLP

(57) ABSTRACT

A system for cleaning pipes and pipe joints where the interior surface of the pipe becomes coated with material being processed comprising a cylindrical cleaning body having opposing first and second ends, said cylindrical body having an annular shape with interior and exterior walls so that the outer wall contacts the interior surface of a pipe and wherein ends of the cleaning body have means for removing material deposited on the interior surface, a means for moving the apparatus along the length of said pipe, a first and second means for cleaning said cleaning body having passages that allow fluid to pass through, wherein said first and second cleaning means mates with said first and second ends of said cleaning body, where said cleaning body is moved into contact with said cleaning means to dislodge accumulated deposits from the cleaning body and simultaneously dislodging accumulated deposits from said cleaning means.

9 Claims, 6 Drawing Sheets

(56) References Cited

U.S. PATENT DOCUMENTS

| | | | |
|---|---|---|---|
| 3,900,912 A * | 8/1975 | Lenz et al. | 15/104.061 |
| 4,303,477 A | 12/1981 | Schmidt et al. | |
| 5,004,533 A | 4/1991 | Kalnes et al. | |
| 5,032,185 A | 7/1991 | Knapp | |
| 5,389,691 A | 2/1995 | Cha et al. | |
| 5,400,456 A * | 3/1995 | Skibowski | 15/104.061 |
| 5,470,384 A | 11/1995 | Cha et al. | |
| 5,565,161 A | 10/1996 | Auda et al. | |
| 5,566,416 A * | 10/1996 | Karls | 15/104.04 |
| 5,836,524 A | 11/1998 | Wang | |
| 5,903,946 A * | 5/1999 | Collins et al. | 15/104.061 |
| 6,070,285 A * | 6/2000 | Geppert | 15/104.061 |
| 6,172,275 B1 | 1/2001 | Tadauchi et al. | |
| 6,173,469 B1 * | 1/2001 | Laymon | 15/104.061 |
| 6,308,363 B1 * | 10/2001 | Lino et al. | 15/104.061 |
| 6,500,271 B1 * | 12/2002 | Moore et al. | 134/8 |
| 7,344,622 B2 | 3/2008 | Grispin | |
| 7,490,381 B1 * | 2/2009 | Franzino | 15/104.061 |
| 7,681,634 B2 * | 3/2010 | Botnmark et al. | 166/177.3 |
| 7,893,307 B2 | 2/2011 | Smith | |
| 8,011,052 B2 * | 9/2011 | Kapustin et al. | 15/104.061 |
| 8,051,523 B1 * | 11/2011 | Franzino | 15/104.061 |
| 8,192,587 B2 | 6/2012 | Garrison et al. | |
| 8,225,809 B2 * | 7/2012 | Krywitsky | 137/15.07 |
| 8,239,994 B2 | 8/2012 | Dyck | |
| 8,316,500 B2 * | 11/2012 | Freeman et al. | 15/104.061 |
| 8,479,345 B2 * | 7/2013 | Ludlow et al. | 15/104.061 |
| 8,650,694 B2 * | 2/2014 | Pruett et al. | 15/104.061 |
| 8,739,345 B2 * | 6/2014 | Palmer | 15/104.16 |
| 2006/0280669 A1 | 12/2006 | Jones | |
| 2007/0113362 A1 * | 5/2007 | Lino et al. | 15/104.061 |
| 2008/0135244 A1 | 6/2008 | Miller | |
| 2009/0007484 A1 | 1/2009 | Smith | |
| 2009/0031615 A1 | 2/2009 | Joshi et al. | |
| 2009/0227823 A1 | 9/2009 | Huber et al. | |
| 2010/0180391 A1 * | 7/2010 | Pruett et al. | 15/104.061 |
| 2010/0237291 A1 | 9/2010 | Simmons et al. | |
| 2011/0089015 A1 | 4/2011 | Kelley | |
| 2012/0017385 A1 * | 1/2012 | Palmer | 15/104.05 |
| 2012/0017386 A1 * | 1/2012 | Rankin et al. | 15/104.061 |
| 2012/0137458 A1 * | 6/2012 | Knapp | 15/104.061 |

FOREIGN PATENT DOCUMENTS

| | | |
|---|---|---|
| EP | 1647589 A2 | 4/2006 |
| EP | 1105224 B1 | 5/2007 |
| WO | 2008058137 A2 | 5/2008 |
| WO | 2012093079 A2 | 7/2012 |

OTHER PUBLICATIONS

International Preliminary Report on Patentability from PCT/US2013/026412 dated Aug. 19, 2014.

International Search Report and Written Opinion from PCT/US2013/025335 dated Apr. 23, 2013.

International Preliminary Report on Patentability from PCT/US2013/025335 dated Aug. 12, 2014.

First Office Action from Chinese Patent Application No. 201380009739.2 dated Jun. 5, 2015.

First Office Action from Chinese Patent Application No. 201380008981.8 dated Jul. 2, 2015.

Search Report and Written Opinion from Singapore Application No. 11201404709R dated Aug. 17, 2015.

* cited by examiner

ANTI-FOULING APPARATUS FOR CLEANING DEPOSITS IN PIPES AND PIPE JOINTS

BACKGROUND OF THE INVENTION

The present invention is directed to an improved pipe cleaning assembly. More specifically, the present invention provides means for periodic or continuous cleaning of pipes and pipe joints in industrial apparatus such as those experiencing deposition of mineral and/or organic solids onto their interior surfaces and those having a condensation zone or outlet to a condensation pipe either alone or combined with reflux condensation where the condensation step is prone to accumulation of deposits on the interior surfaces of the pipes and pipe joints carrying gases with entrained aerosols and/or particulate matter that are subject to deposition and/or condensation.

Certain industrial processes, including but not limited to pyrolysis, petrochemical, metallization and semi-conductor processes, produce vapor streams containing nanoparticles and microparticles which tend to condense and/or otherwise deposit on the interior walls of pipes and pipe joints integral to the process apparatus. This condition is especially problematic for continuous processes having pipe connections allowing for discharge from one system component to another, such points of discharge often promoting said condensation and/or deposition of solids where flow rates, flow directions and flow volumes change within the process apparatus.

Moreover, said deposits can form strongly aggregated, turbostratic or crystalline crusts on the interior walls of pipes and pipe joints which can be resistant to removal by wiping members having blunt faces without knife edges. The term "turbostratic" as used herein is intended to mean a crystal structure in which basal planes have slipped out of alignment and/or an amorphous structure which may be mixed w/said crystal structure(s), if present. Without a means for continual and effective in situ removal of said condensates and deposits, which may otherwise accumulate in increasing thickness with time, said industrial process production becomes inefficient because it must be interrupted by costly temporary shutdowns to allow for disassembly of the affected components and either subsequent manual cleaning of pipes and pipe joints with scraping or abrasive cutters, or alternative replacement of the affected parts. After disassembly for cleaning or replacement of pipes and pipe joints, additional cost of direct labor expense and lost production time is incurred for reassembly, leak testing and, in many cases, the system must be purged of atmospheric air prior to resumption of the process. When replacement is required, the cost of parts inventory must be considered.

Such continual need for ex situ cleaning can pose opportunity for chronic exposure of workers to airborne hazardous or even poisonous components of condensates and deposits. To protect workers, such exposure must be mitigated in negative-pressure environments employing dust collection systems, often with HEPA filters. These means to protect workers from chronic exposure to or even poisonous components of condensates and deposits involves additional expense which would otherwise not be required if an effective in situ system had been deployed.

The prior art discloses various devices to clean pipes. However, many of these describe inserting a cleaning apparatus, referred to as a "pig" in the industry, which is forced through the piping by the pressure of the fluid therein. Such devices do not allow for movement counter to the fluid flow, and the trip is one-way. Moreover, the pig must be inserted and removed each time it is used. Moreover, such devices are typically soft and flexible, and merely wipe soft accretions from the interior of the pipes; they so not scrape or scour hardened deposits.

Prior art does not describe means to clean the interior of heated pipes and pipe joints having heating elements on the exterior of the pipes, such heating elements interfering with the operation of an exterior magnetic ring sleeve that cannot advance the interior wiping member past the lengths covered by heating elements. Accordingly, such heated systems cannot be completely cleaned via prior art, leaving interior accumulating deposits in the pipes and pipe joints which, if left in place, can obstruct the flow through the piping system.

Nor does prior art describe means to specifically and continually eliminate hardening, hardened, turbostratic, crystallizing or crystallized substances from the interior of pipes and pipe joints with an internal movable device. Accordingly, if the internal movable device is not constantly moving, or engaged to move with only brief intervals between cleaning events, these fouling, hardening, hardened, crystallizing or crystallized substances can accumulate in the interior of the pipes and pipe joints at a rate by which the thickness of these fouling substances can become sufficiently thick, and the resistance to cleaning become sufficiently high, that the internal movable device cannot maintain a clean interior pipe and pipe joint surface, or can become stuck in the pipe altogether, creating a condition which promotes additional fouling, plugging and, potentially, unwanted or dangerous pressure build-up.

Nor does prior art provide a solution to cleaning of the anti-fouling apparatus itself. Given that deposits in the interior or pipes and pipe joints can also foul an interior cleaning device which is similarly exposed to the same environment of deposition as is the piping run that contains it, in the absence of the self-cleaning action provided by this invention, an anti-fouling device would itself become fouled.

Nor does prior art describe a means to counteract the phenomenon of preferential or accelerated deposition of fouling deposits at points where material flow velocities change within the piping run. The present invention, by virtue of its continual operation to prevent accumulation of fouling deposits at any point within the system where the present invention is deployed, provides a solution to the problem of preferential or accelerated deposition because such deposits are removed from all points in the system irrespective of the rate at which such deposits would otherwise accumulate.

SUMMARY OF THE INVENTION

The present invention is directed to an improved cleaning assembly or system for pipes and pipe joints to remove deposits which may otherwise accumulate and foul the pipes and joints as well as the surfaces of the cleaning assembly. The assembly includes three components that go inside the pipe(s), including an internal mobile component plus upper and lower fixed pipe fittings having surfaces which mates with respect to the internal mobile component, plus a means for moving the internal mobile component such as a mobile ring upon which are mounted or embedded one or more magnets attracted in preferred orientation to the internal mobile component, thereby providing for controlled movement of the mobile, internal component in combination with the mobile magnetic ring. The internal mobile component includes robust knife edges mated to the upper and lower flanges, which have openings to accommodate pass-through of the knife edges on the mobile wiping component. The system can be operated manually or electronically controlled, and can be configured for deployment in straight or curved piping runs, in heated or unheated systems, systems with multiple pipe joints and tees, and in systems requiring continuous operation.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
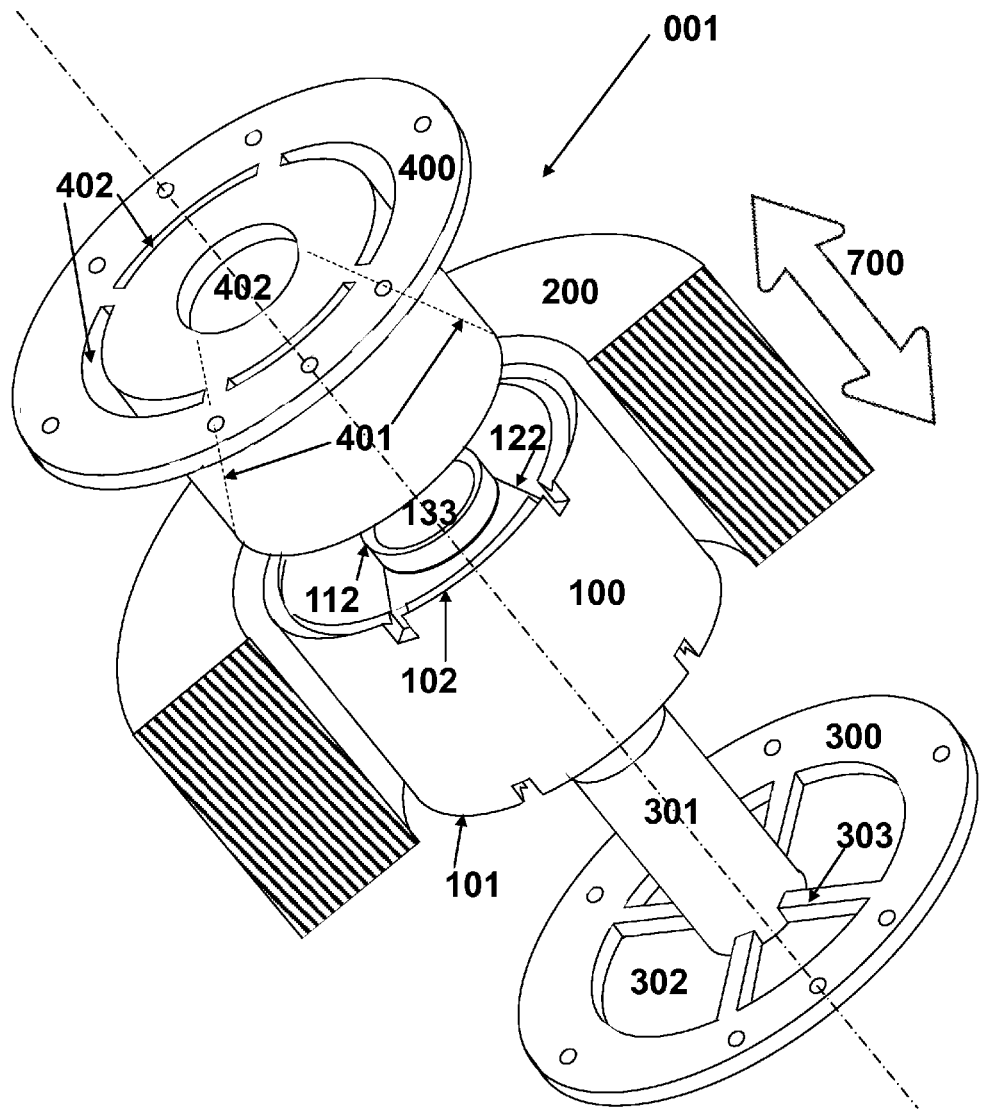
FIG. 1 is an overview of the present invention showing all four components in relationship to one another, as well as the motion of the mobile internal component paired to its mobile external magnetic ring in accordance with the present invention.

The present invention provides a means for cleaning the interior of pipes and pipe joints in industrial apparatus impacted by fouling deposits, such as particles or liquids that are entrained in the gas or vapor exiting a piece of equipment. The particles and/or liquids can accumulate in flow lines and points of vapor transfer. By periodically or continuously cleaning while the industrial apparatus continues to run, the apparatus is allowed to operate without significant interruption or need the extensive cleaning that is necessitated by a larger build-up.

The present invention is a four-component cleaning assembly, including three internal components plus one external component. An internal wiping component or member is in mating relationship with a pipe interior and it is moved to corresponding special upper and lower pipe flanges as well as the internal wall of the pipe. The internal wiping component is a cylindrical cleaning body that moves within the pipe. Such a cleaning body is often referred to as a pig in the industry. The external component is outside of the pipe and surrounds the walls of the pipe. The external component comprises a ring containing one or more magnets designed for deployment in and around low- or non-magnetic pipes and pipe joints. The movement of the external magnet component will cause a corresponding movement of the internal wiping component, causing the wiping member to act like a shuttle, moving up and down or back and forth repeatedly. The external component is oriented with respect to the external wall of the pipe via an indexing groove in the outer wall of the pipe as well as corresponding indexing pins affixed to the external component. The internal moveable wiping component or member is an annular ring with robust knife-edges mated for efficient cleaning and discharge of deposits to special upper and lower pipe flanges having openings to accommodate pass-through of the knife edges on the wiping component or member. The internal component incorporates alternating circumferential segments of magnetic and non-magnetic materials to provide fixed orientation with respect to the external mobile magnetic ring. The sides of the knife edges of the internal wiping component can be configured in various shapes, including, but not limited to wedge shapes, or chevron or inverted "V" shapes to promote efficient removal of deposits on the interior surface of the pipe as well as to allow for proper alignment of the internal wiping component with the corresponding special upper and lower pipe flanges should wear occur in the indexing groove or indexing pins or should the internal wiping member become misaligned with the external component.

The upper and lower pipe flanges will work in conjunction with the wiping component to simultaneously clean the knife edges and the internal openings in the mating flanges. The present invention can be configured for use in heated or unheated systems, as well as in straight or curved piping runs or pipes of any cross-section, and for cleaning points of vapor transfer in piping runs where accumulation of unwanted deposits is especially problematic. Moreover, the present invention can be configured to address curved pipe runs & pipe joints where the length of the sliding component and radius of the curved pipe are jointly configured to allow for minimum irreducible accumulation in the curved portion of the piping run.

Of the three pieces having internal function, the moveable internal wiping member is magnetically connected or attracted to an indexed, external magnetic ring sleeve which constitutes means of moving the internal wiping flange for in situ and, as may be desired, continuous, removal of deposits of crusts, sludge and powders from the internal surfaces of the pipes and pipe joints which, if not cleaned, may otherwise accumulate and foul the interior of the pipes and pipe joints. Of special importance is the ability to harden and appropriately shape the wiping edges of the internal movable wiping component to remove hardening, hardened, turbostratic, crystallizing or crystallized fouling substances as rapidly as they deposit.

The moveable internal wiping member can be designed with adequate length, and the special mating pipe flanges can be properly positioned, to allow for cleaning of the interior surfaces beneath external heating elements, thermocouples in wells, skin thermocouples or other external obstructions which would otherwise preclude continual motion of the exterior magnetic ring along the length of a piping run. In addition, the wiping member is moved through the pipes via a motive force applied to the external magnet, rather than relying on internal pressure or flow to move the cleaning apparatus as in the prior art. In other words, the apparatus can move independent of, and even counter to, the flowing vapor or fluid within the pipes.

The system embodied by the present invention is highly versatile and well suited to applications having specific demands for custom components made to clean pipes and pipe joints in unusual and challenging environments. Examples of the present invention's versatility include but are not limited to applications wherein one or more four component anti-fouling systems can be deployed in the same piping run such that one or more internal movable wiping components can clean the interior of pipe surfaces between and beneath heating elements affixed to the exterior of the pipes and flanges. Thus, the system can be combined with piping as a self-cleaning piping system or can be used to retrofit an existing piping system. The following is one such embodiment; it is intended for purposes of understanding the invention, not for purposes of limiting the invention. Any and all limitations of the invention disclosed herein are restricted to the claims below.

Figure 6:
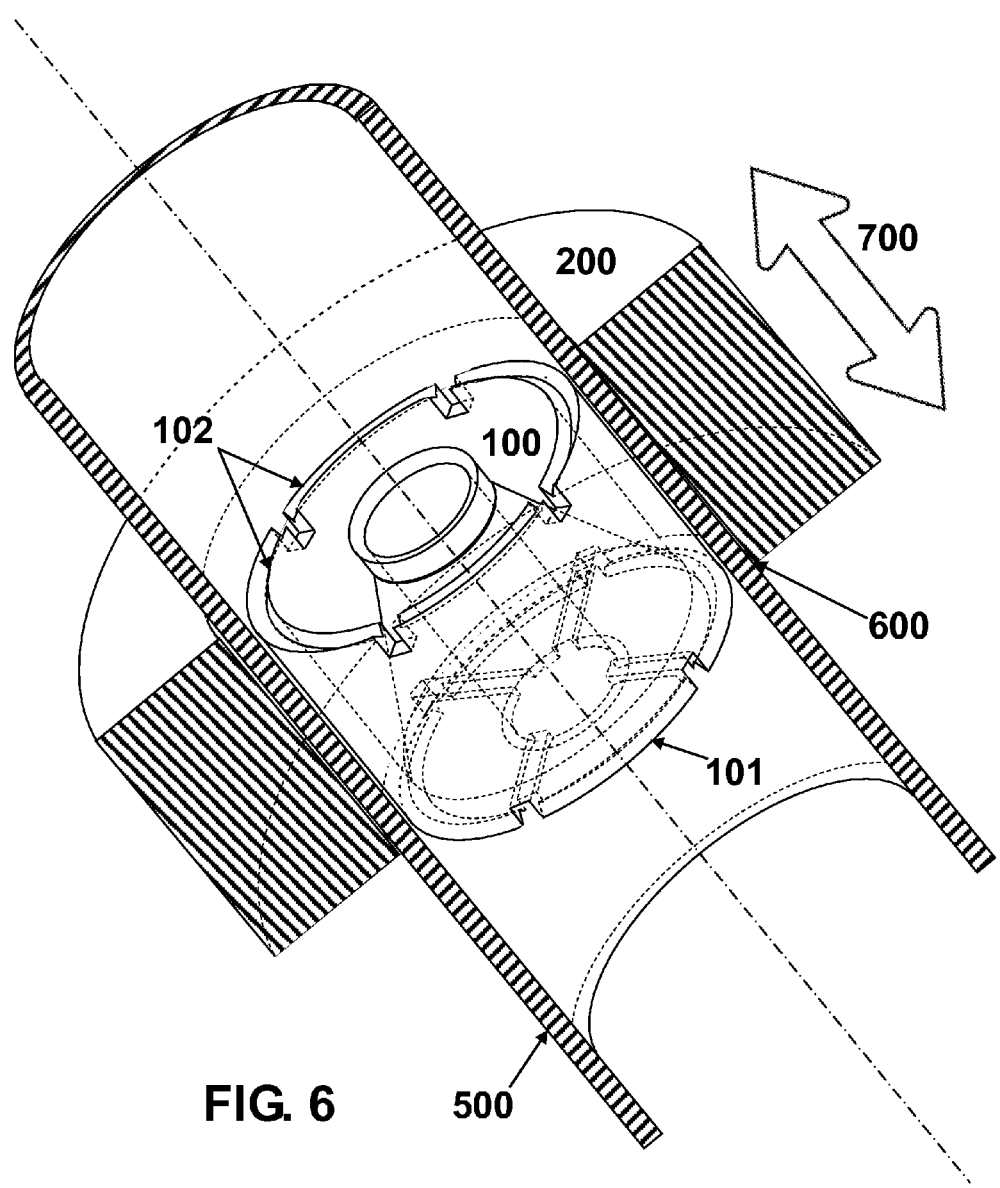
FIG. 6 is an isometric, cut-away view of a section of pipe containing the internal mobile component paired to its respective mobile external magnetic ring comprising a portion of the apparatus in accordance with the present invention.

As seen in FIG. 1, the present apparatus is a four-component anti-fouling cleaning assembly 001 deployed for use in a non-magnetic pipe 500 (shown in FIG. 6). The pipe material is not critical, but since the wiping component is moved via and external magnet, a magnetic piping material would prevent the apparatus from functioning properly, and is thus disfavored. The anti-fouling cleaning assembly 001 comprises an internal moveable wiping component 100, a sliding external component comprised of a ring containing one or more magnets 200, a lower cleaning means or pipe flange 300 having openings 302 mated for efficient cleaning and discharge of deposits to protruding knife edges 101 and 111 (shown in FIG. 2) on the moveable wiping component 100, and an upper cleaning means or pipe flange 400 having openings 402 mated for efficient cleaning and discharge of deposits to protruding knife edges 102 and 112 on the moveable wiping component 100. The lower pipe flange 300 features a stud 301 supported by spokes 303 dimensionally mated for efficient cleaning and discharge of deposits to the center opening 133 in the moveable wiping component 100, which is cleaned by knife edge 111 (shown in FIG. 2). The upper pipe flange 400 features an internal, conical raised cleaning surface 401 that mates to surface 122 of the moveable wiping component 100. Said upper pipe flange raised cleaning surface 401 comprises a funnel or an annular ring with an internal diameter which gradually increases toward its lower end along its length. The central opening 402 is cleaned by knife edge 112. The cleaning surface 122 mates with, and rests flush upon, said upper pipe flange raised surface 401 when moveable wiping component 100 reaches the maximum upper length of its path. Internal moveable wiping component 100 has at its center a hole 133 that allows dislodged fouling material to pass through and prevent build-up on internal wiping member 100. The exterior surface of the non-magnetic pipe is milled with an indexing groove (not shown), such indexing groove running the length of the exterior of non-magnetic pipe to accommodate a mated indexing pin (not shown) protruding from the inside of the magnetic ring 200.

External force is applied to magnetic ring 200 along the longitudinal axis of a non-magnetic pipe, maintaining plurality with moveable wiping component 100 by means of magnetic attraction between magnetic ring 200 and moveable wiping component 100. Such force causes longitudinal motion or movement 700 to occur repeatedly in both directions between lower pipe flange 300 and upper pipe flange 400 to remove deposits from the interior of the non-magnetic pipe. As moveable wiping component 100 meets lower pipe flange 300, knife edges 101 and 111 clean deposits which may tend to accumulate in openings 302, and stud 301 cleans deposits which may tend to accumulate in the center opening 133 in the moveable wiping component 100. Similarly, as moveable wiping component 100 meets upper pipe flange 400, knife edges 102 and 112 clean deposits which may tend to accumulate in openings 402.

The indexing groove (not shown) and its mating indexing pin (not shown) protruding from the inside of the magnetic ring 200 prevent magnetic ring 200 from rotating, which maintains proper orientation of the members and assure that moveable wiping component 100 does not rotate inside the pipe, thereby assuring proper alignment between moveable wiping component 100, lower pipe flange 300 and upper pipe flange 400. The combination of indexing groove and its mating indexing pin is not critical and other guiding means can be used, including but not limited to a spline and notch system, or a computer-controlled alignment system.

If the pipe is positioned in a vertical orientation, deposits loosened by knife edges 101 and 102 will fall through openings 302 and/or be carried as suspended particles through openings 302 and 402 then subsequently through the industrial apparatus in which anti-fouling cleaning assembly 100 is deployed, thereby maintaining an open and clean system of pipes and pipe flanges.

If the pipe is positioned in a horizontal orientation, deposits loosened by knife edges 101 and 102 will be advanced through openings 302 and 402 and/or be carried as suspended particles through openings 302 and 402, remaining mobile in the industrial apparatus in which anti-fouling cleaning assembly 100 is deployed, thereby maintaining an open and clean system of pipes and pipe flanges.

FIG. 1 reiterates the importance of proper alignment between moveable wiping component 100 and lower pipe flange 300 as well as between moveable wiping component 100 and upper pipe flange 400 such that cleaning and discharge of deposits from all surfaces can occur.

The external force described herein is not critical. Sliding external ring 200 may be moved via any known or conventional physical force means, including but not limited to pulleys, pistons, gears, pinions, linear induction motors, or by hand/human effort.

Figure 2:
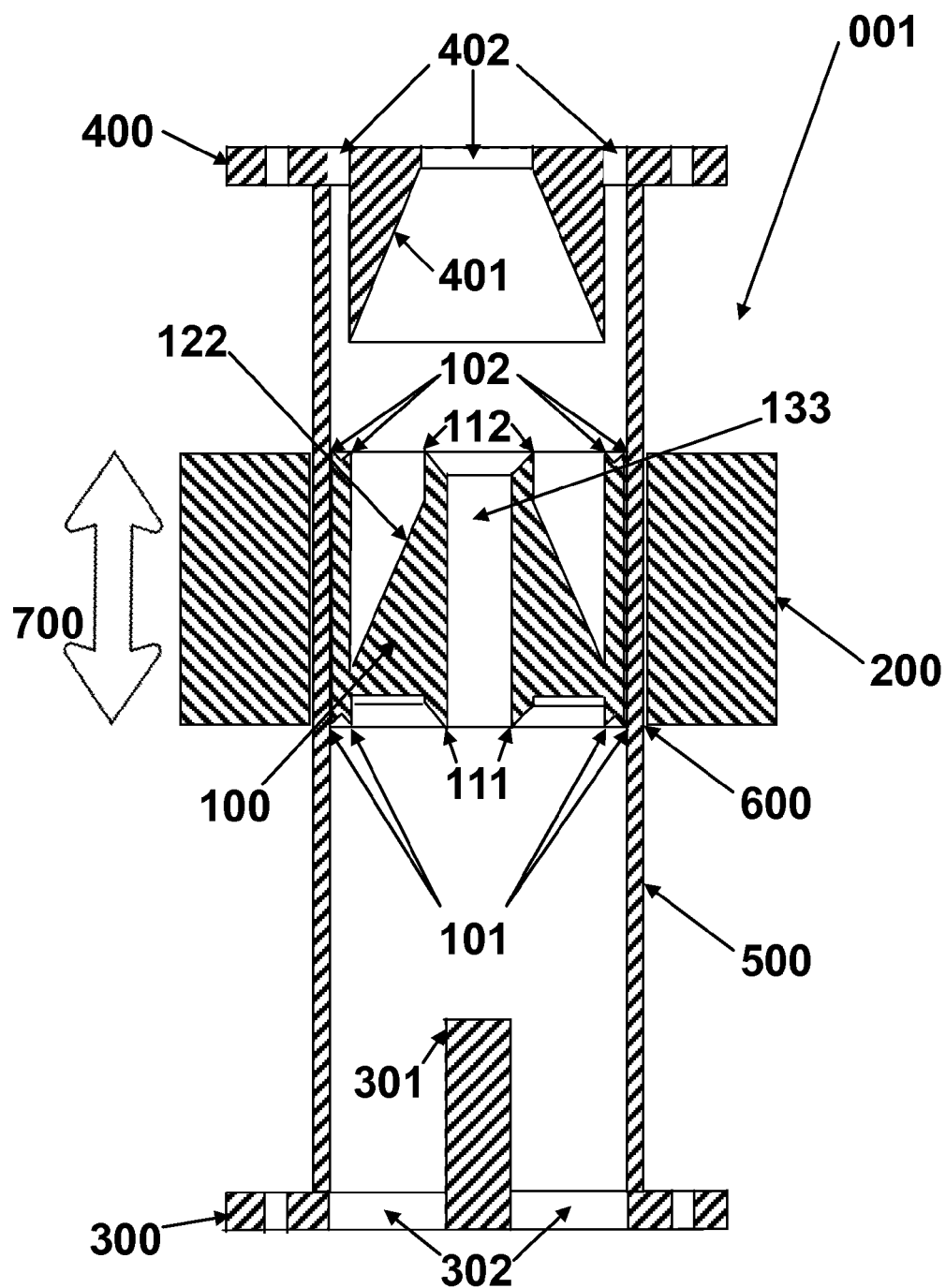
FIG. 2 is a cross-sectional view through the center of the apparatus and pipe showing all four components in relationship to one another, as well as the motion of the mobile internal component paired to its mobile external magnetic ring in accordance with the present invention.

FIG. 2 is a cross-sectional view through the center of the apparatus showing all four components in relationship to one another and the pipe, as well as the motion of the mobile internal component paired to its mobile external magnetic ring in accordance with the present invention. Lower pipe flange 300 has openings 302 which are mated for efficient cleaning and discharge of deposits to protruding knife edges 101 and 111 on the moveable wiping component 100. Upper pipe flange 400 has openings 402 which are mated for efficient cleaning and discharge of deposits to protruding knife edges 102 and 112 on the moveable wiping component 100. Lower pipe flange 300 features a stud 301 dimensionally mated for efficient cleaning and discharge of deposits to the center opening 133 in the moveable wiping component 100, which is cleaned by knife edge 111. Upper pipe flange 400 features an internal, conical raised cleaning surface 401 that mates to surface 122 of the moveable wiping component 100. Said upper pipe flange raised cleaning surface 401 comprises a funnel or an annular ring with an internal diameter which gradually increases toward its lower end along its length. The central opening 402 is cleaned by knife edge 112. The cleaning surface 122 mates with, and rests flush upon, said upper pipe flange raised cleaning surface 401 when moveable wiping component 100 reaches the maximum upper length of its path. Internal moveable wiping component 100 has at its center a hole 133 that allows dislodged fouling material to pass through and prevent build-up on internal wiping member 100. The exterior surface of the non-magnetic pipe 500 is milled with an indexing groove 600 (not shown), such indexing groove running the length of non-magnetic pipe 500 to accommodate a mated indexing pin (not shown) protruding from the inside of the magnetic ring 200.

External force is applied to magnetic ring 200 along the longitudinal axis of non-magnetic pipe 500, maintaining plurality with moveable wiping component 100 by means of magnetic attraction between magnetic ring 200 and moveable wiping component 100. Such force causes longitudinal motion 700 to occur repeatedly in both directions between lower pipe flange 300 and upper pipe flange 400 to remove deposits from the interior of non-magnetic pipe 500.

Repeated contact between movable wiping component 100 and upper flange 400 prevent accumulation of deposited material within the conical cavity in moveable wiping component 100 resulting from direct deposition of aggregated, turbostratic or crystalline crusts on cleaning surface 122 or accumulation of loose, dislodged material resulting from the cleaning action of knives 102 and 122. After moveable wiping component 100 comes into direct contact with lower flange 300, dislodged material resulting from operation of the apparatus will pass through openings 302 either by action of gravity, by action of particles entrained in the vapor or liquid flow through pipe 500 or by both mechanisms in tandem. After moveable wiping component 100 comes into direct contact with upper flange 400, dislodged material resulting from operation of the apparatus will pass through openings 402 either by action of gravity, as particles entrained in the vapor or liquid flow through pipe 500 or by both mechanisms in tandem. Deposits in the cavity of moveable wiping component 100 which would otherwise tend to accumulate around cleaning surface 122 are removed via a relative vacuum in the cavity created each time that moveable wiping component 100 moves away from upper flange 400. Continuous repetition of this cycle in turn prevents accumulation of deposited material around cleaning surface 122.

Figure 3:
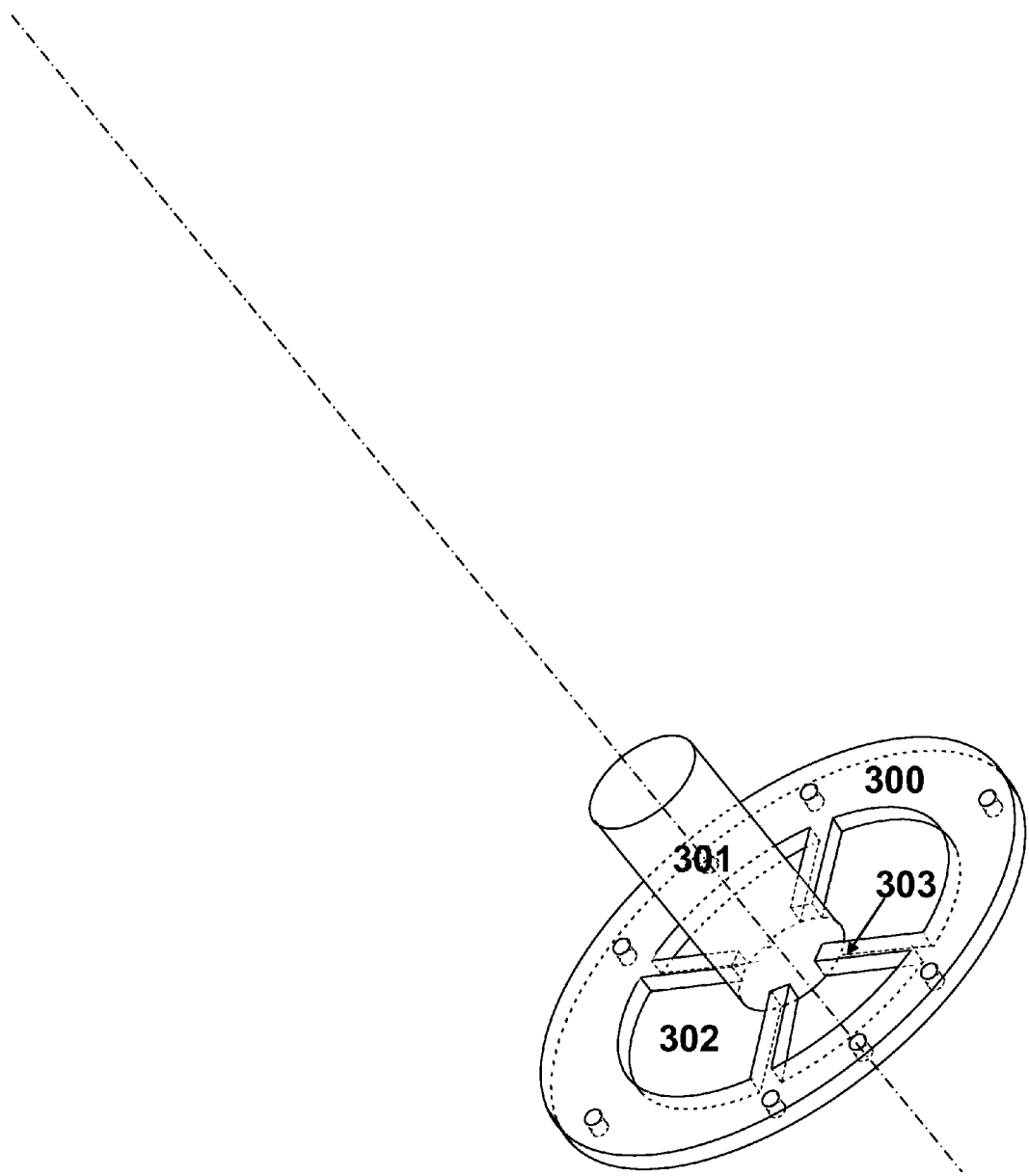
FIG. 3 is an isometric view of the lower fixed flange comprising a portion of the apparatus in accordance with the present invention.
Figure 4:
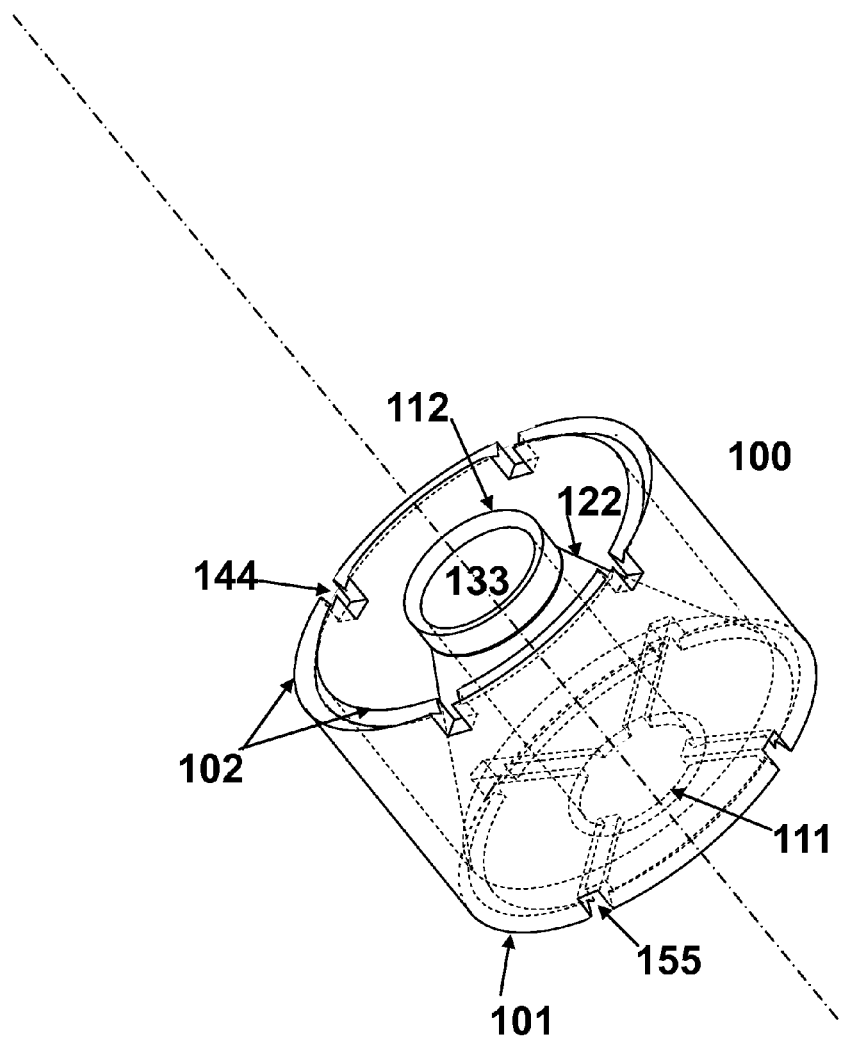
FIG. 4 is an isometric view of the internal mobile component comprising a portion of the apparatus in accordance with the present invention.

FIG. 3 is an isometric view of lower fixed flange 300 which includes flange stud 301 supported by spokes 303. Between spokes 303 are openings 302 through which passes deposited material dislodged by knives 101 (FIG. 4) of internal mobile component 100 (FIG. 4). Support spokes 303 align with grooves 155 (FIG. 4) in internal wiping member 100 when internal wiping member 100 has come into contact with lower flange 300.

FIG. 4 is an isometric view of the internal mobile component 100 which cleans deposits from the interior surface of pipe 500 (FIG. 6) by cleaning action of knife surfaces 102 and 112 on the upper end of internal mobile component 100 and knife surfaces 101 and 111 on the lower end of internal mobile component 100. Grooves 155 align with support spokes 303 (FIG. 3) of lower flange 300 and knife edges 101 pass through openings 302 (FIG. 3) when internal mobile component 100 has reached the lower termination of its maximum travel distance within pipe 500. Conversely, grooves 144 align with support spokes 403 (FIG. 5) of upper flange 400 and knife edges 102 pass through openings 402 (FIG. 5) when internal mobile component 100 has reached the upper termination of its maximum travel distance within pipe 500. Cleaning surface 122 of internal mobile component 100 mates with, and rests flush upon, said upper pipe flange raised cleaning surface 401 when moveable wiping component 100 reaches the maximum upper length of its path.

Figure 5:
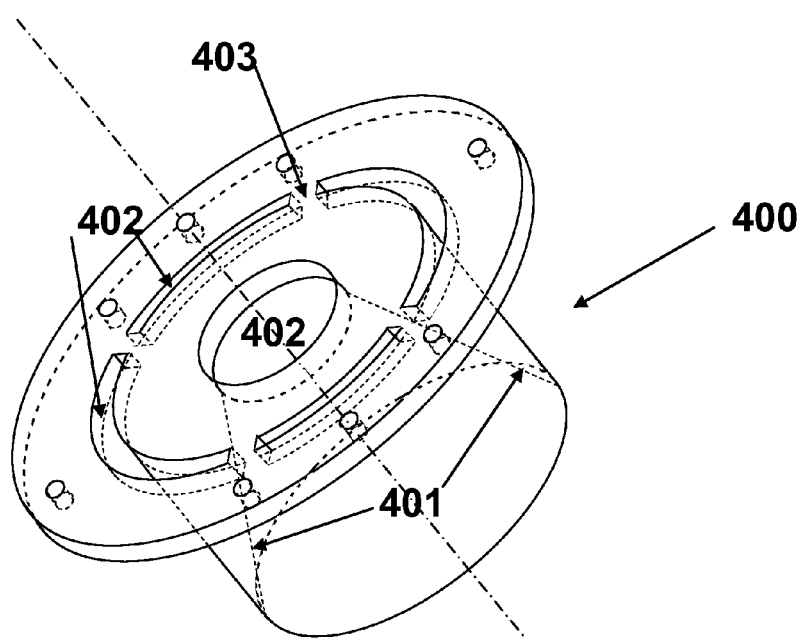
FIG. 5 is an isometric view of the upper fixed flange comprising a portion of the apparatus in accordance with the present invention.

FIG. 5 is an isometric view of the upper fixed flange 400 which includes an internal, conical raised cleaning surface 401 that mates to surface 122 (FIG. 4) of the moveable wiping component 100 (FIG. 4). Said upper pipe flange raised cleaning surface 401 comprises a funnel or an annular ring with an internal diameter which gradually increases toward its lower end along its length. The central opening 402 is cleaned by knife edge 112 (FIG. 4). The cleaning surface 122 mates with, and rests flush upon, said upper pipe flange raised surface 401 when moveable wiping component 100 reaches the maximum upper length of its path. The portion of flange 400 containing the central opening, one of 5 openings 402, is connected to the outer ring of flange 400 and supported by spokes 403. Between spokes 403 are the outer 4 of a total of 5 openings 402 through which passes deposited material dislodged by knives 102 (FIG. 4) of internal mobile component 100 (FIG. 4). Support spokes 403 align with slots 144 (FIG. 4) in internal wiping member when internal wiping member has come into contact with upper flange 400.

FIG. 6 is an isometric, cut-away view of a section of pipe 500 containing the internal mobile component 100 paired to its respective mobile external magnetic ring 200. The exterior surface of the non-magnetic pipe 500 is milled with an indexing groove 600 (not shown), such indexing groove running the length of non-magnetic pipe 500 to accommodate a mated indexing pin (not shown) protruding from the inside of the magnetic ring 200. External force is applied to magnetic ring 200 along the longitudinal axis of non-magnetic pipe 500, maintaining plurality with moveable wiping component 100 by means of magnetic attraction between magnetic ring 200 and moveable wiping component 100. Such force causes longitudinal motion 700 to occur repeatedly in both directions between lower pipe flange 300 (FIG. 3) and upper pipe flange 400 (FIG. 5) to remove deposits from the interior of non-magnetic pipe 500.

The importance of indexing groove 600 in pipe 500 and its mating indexing pin (not shown) protruding from the inside of the magnetic ring 200 becomes evident, to assure that moveable wiping component 100 does not rotate inside non-magnetic pipe 500, thereby assuring proper alignment between moveable wiping component 100, upper pipe flange 400 and lower pipe flange 300. If internal wiping component 100 were to become misaligned in the absence of indexing groove 600 and its mating indexing pin protruding from the inside of the magnetic ring 200, knife edges 101 would not pass through corresponding openings 302, and knife edges 102 would not pass through corresponding openings 402. Lower pipe flange stud 301 is held in place by four support spokes 303 and defines said openings 302.

The mass of the wiping component 100 is important. The exact mass is not critical, but care must be taken to ensure it is neither too heavy, nor too light. It is important that the member be massive enough to dislodge build-up inside the pipes, yet light enough so that the external magnets can support it and pull or displace it though the pipes. If the member is too heavy, the magnets might not be able to keep it in place and it could fall and damage the pipe or the member itself.

The exact dimensions of the apparatus are not critical, including the dimensions of said hole or opening 133 (FIG. 1). However, care must be taken in sizing opening 133 as its size determines flow rate downstream. Too small an opening could severely hamper the flow rate and adversely affect the overall process. Because the size of hole 133 determines the size of flange stud 301, too large of an opening would require the flange stud 301 to be obtrusive, resulting in excessive and undesirable decrease in the total cross sectional opening 302, and likewise impede flow.

The apparatus can be deployed vertically in the orientation shown in FIGS. 1 through 6, in the opposite vertical orientation, a horizontal orientation, or at any angle which may be desired. The internal geometry of movable wiping component 100 and the respective mating geometries of relevant portions of flanges 300 and 400 provide for prevention of accumulated deposits resulting from operation of the apparatus which is the embodiment of this invention or the industrial processes to which the invention can be deployed, including but not limited to pyrolysis, petrochemical, metallization and semi-conductor processes. The present invention not only prevents accumulation of deposits in a piping system by the constant wiping action of the internal mobile component 100 which continually removes deposits on the internal surface of pipe 500 as they form, but also by creation of momentary turbulent flow which results from the action of internal mobile component 100 alternately mating with flanges 300 and 400. The self-cleaning feature of the anti-fouling apparatus, and the resulting turbulent flow, counteracts the phenomenon of preferential or accelerated deposition of fouling deposits at points where material flow velocities change within the piping run because particles of deposits removed from pipe 500 by internal wiping component 100 are not allowed to settle or otherwise accumulate in the apparatus. Material changes in flow velocity occur when internal mobile component 100 alternately mates with flanges 300 and 400 as a result of momentary flow rate changes when the effective cross sectional internal area available to flow momentarily changes. The momentary turbulent flow is a pulsed flow which promotes continual movement of suspended material through the piping system.

A further embodiment (not shown) posits a pyrolysis apparatus having one or more vapor discharge pipes each equipped with an anti-fouling apparatus incorporating one or more wiping members (similar to 100 in FIG. 1), wherein turbostratic and other forms of carbon deposits and mineral deposits which may form in said vapor discharge pipes and/or points of connection of these vapor discharge pipes to their corresponding pyrolysis reactor(s) are mitigated by the longitudinal motion of the wiping members, thereby having a result of in situ destruction of said deposits which will fall as heavy particles vertically downward and/or will be transported as light particles with the vapor passing through the piping system. Material enters the input section of the apparatus where it contacts surfaces within the member causing deposition or condensation. Upon removal of deposits and/or condensate, the deposition and/or condensation products leave the apparatus via the output section entrained in the vapor flow and/or fall by action of gravity. The heavy components are recycled back into the system and the lighter products are processed downstream.

Notwithstanding the detailed descriptions of the present invention, the present invention has been described by means of example and in terms of the preferred embodiments. Application, use and/or deployment of the present invention are not limited to the embodiments disclosed herein, such that persons skilled in the art can employ a variety of dimensional and configurable modifications as may become apparent. Therefore, the scope of the appended claims should be accorded the broadest interpretation so as to encompass all such modifications and similar arrangements.

What is claimed is:

1. A system for cleaning pipes and pipe joints where the interior surface of the pipe becomes coated with material being processed comprising
   a cylindrical cleaning body having opposing first and second ends,
   said cylindrical cleaning body having an annular shape with an interior wall and an exterior wall so that the exterior wall contacts the interior surface of a pipe and wherein ends of the cleaning body have means for removing material deposited on the interior surface,
   a means for moving the cleaning body along the length of said pipe,
   a first means for cleaning said cleaning body having passages that allow fluid to pass through,
   a second means for cleaning said cleaning body having passages that allow fluid to pass through,
   wherein said first cleaning means mates with said first end of said cleaning body where said cleaning body is moved into contact with said first cleaning means to dislodge any accumulated deposits from the cleaning body and simultaneously dislodging any accumulated deposits from said cleaning means,
   wherein said second cleaning means mates with said second end of said body where said cleaning body is moved into contact with said second cleaning means to dislodge any accumulated deposits from the cleaning body and simultaneously dislodging any accumulated deposits from said cleaning means.

2. The system of claim 1 wherein said means for moving the cleaning body comprises one or more magnets.

3. The system of claim 1 wherein said cleaning body functions while fluid flows through the pipe.

4. The system of claim 1 wherein said means for moving the cleaning body further comprises a means for preventing the rotation of said means for moving and said cleaning body.

5. A cleaning pig for cleaning pipes and pipe joints where the interior surface of the pipe becomes coated with material being processed comprising
   a cylindrical cleaning body having opposing first and second ends, and
   a means for moving the cleaning body along the length of said pipe,
   wherein said cylindrical cleaning body has an annular shape with an interior wall and an exterior wall so that the exterior wall can contact the interior surface of a pipe,
   wherein said cylindrical body has an opening through the interior thereof to allow for the passage of fluids therethrough, and
   wherein ends of the cleaning body have means for removing material deposited on the interior surface of a pipe.

6. The cleaning pig of claim 5 wherein the ends of the cleaning body are knife edges.

7. The cleaning pig of claim 5 wherein the ends of the cleaning body have inner and outer edges and a V-shaped groove in between.

8. A self-cleaning pipe and pipe joint system where the interior surface of the pipe becomes coated with material being processed
   comprising a pipe or pipe joint,
   a cylindrical cleaning body having opposing first and second ends,
   said cylindrical cleaning body having an annular shape with an interior wall and an exterior wall so that the exterior wall contacts the interior surface of a pipe and wherein ends of the cleaning body have means for removing material deposited on the interior surface of the pipe or pipe joint,
   a means for moving the cleaning body along the length of said pipe or pipe joint,
   a first cleaning means attached to a first end of said pipe or pipe joint having passages that allow fluid to pass through,
   a second cleaning means attached to a second end of said pipe or pipe joint having passages that allow fluid to pass through,
   wherein said first cleaning means mates with said first end of said cleaning body to dislodge any accumulated deposits from the cleaning body and simultaneously dislodging any accumulated deposits from said cleaning means, and
   wherein said second cleaning means mates with said second end of said body to dislodge any accumulated deposits from the cleaning body and simultaneously dislodging any accumulated deposits from said cleaning means.

9. A cleaning pig for cleaning pipes and pipe joints comprising:
- a cylindrical cleaning body having opposing first and second ends,
- a first and second means for cleaning said cleaning body,
- wherein said first cleaning means is capable of mating with said first end of said cleaning body thereby dislodging any accumulated deposits from the cleaning body, and
- wherein said second cleaning means is capable of mating with said second end of said cleaning body thereby dislodging any accumulated deposits from the cleaning body
- wherein said cleaning body has an annular shape with an interior wall and an exterior wall so that the exterior wall can contact an interior surface of the pipe,
- wherein said cleaning body has an opening through the interior thereof to allow for the passage of fluids therethrough, and
- wherein the ends of the cleaning body have means for removing material deposited on the interior surface of the pipe.

* * * * *